US009513066B2

(12) United States Patent
Wiebelt et al.

(10) Patent No.: US 9,513,066 B2
(45) Date of Patent: Dec. 6, 2016

(54) HEAT EXCHANGER (71) Applicant: Behr GmbH & Co. KG, Stuttgart (DE)

(72) Inventors: Achim Wiebelt, Deidesheim (DE); Stefan Hirsch, Stuttgart (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 310 days.

(21) Appl. No.: 14/038,860

(22) Filed: Sep. 27, 2013

(65) Prior Publication Data

US 2014/0090807 A1    Apr. 3, 2014

(30) Foreign Application Priority Data

Sep. 28, 2012   (DE) .................. 10 2012 217 875

(51) Int. Cl.
*F28F 7/00*     (2006.01)
*F28F 3/12*     (2006.01)
(Continued)

(52) U.S. Cl.
CPC . *F28F 1/00* (2013.01); *F28F 3/12* (2013.01); *F28F 9/0246* (2013.01);
(Continued)

(58) Field of Classification Search
CPC ........ F28D 1/0316; F28D 1/04; F28D 1/053; F28D 1/05316; F28D 1/05325; F28D 1/05333; F28D 1/05366; F28D 1/05375; F28D 2021/0043; F28D 1/03; F28D 1/0308; F28D 1/0325; F28D 1/0341; F28D 1/035; F28D 1/0366; F28D 1/0383; F28F 1/022; F28F 1/40; F28F 3/022; F28F 3/044; F28F 9/0202; F28F 9/0209; F28F 9/0219; F28F 9/04; F28F 9/08; F28F 9/06; F28F 9/12; F28F 9/14; F28F 9/162; F28F 9/165; F28F 3/12; F28F 9/0221; F28F 9/0226
USPC ........ 392/502, 354, 357, 377; 219/539, 540, 219/544, 546; 122/367.1, 367.3, 32
See application file for complete search history.

(56) References Cited

U.S. PATENT DOCUMENTS 4,955,435 A * 9/1990 Shuster ................ F28D 1/035
126/663
5,353,370 A * 10/1994 Kim ...................... G05D 23/22
219/483

(Continued)

FOREIGN PATENT DOCUMENTS

DE    20 2012 102 349 U1    9/2012

OTHER PUBLICATIONS

German Search Report, Application No. DE 10 2012 217 875.9, Aug. 1, 2013, 5 pgs.

*Primary Examiner* — Allen Flanigan
*Assistant Examiner* — Jason Thompson
(74) *Attorney, Agent, or Firm* — Paul D. Strain, Esq.; Strain & Strain PLLC (57) ABSTRACT

Heat exchanger having a housing, having a first fluid connection and a second fluid connection, the housing being in fluid communication with a fluid circuit, and a fluid flowing through said housing, by means of said fluid connections, wherein the housing a housing upper part and a housing lower part, wherein the housing lower part can be connected to the housing upper part by a connecting element by means of an interlocking and/or cohesive connection, wherein the connecting element has a large number of stud-like elements which are connected to one another by means of connecting crosspieces, wherein the connecting element has an at least partially circumferential edge, and at least the stud-like elements and/or the edge are/is in contact with the housing upper part and/or the housing lower part.

9 Claims, 4 Drawing Sheets (51) Int. Cl.
- *F28F 3/14* (2006.01)
- *F28F 1/00* (2006.01)
- *F28F 9/02* (2006.01)
- *F28F 21/06* (2006.01)
- *H01M 10/6568* (2014.01)
- *H01M 10/613* (2014.01)
- *F28D 21/00* (2006.01)

(52) U.S. Cl.
CPC ......... *F28F 21/067* (2013.01); *H01M 10/613* (2015.04); *H01M 10/6568* (2015.04); *F28D 2021/0043* (2013.01); *F28F 2240/00* (2013.01); *F28F 2250/02* (2013.01); *F28F 2275/00* (2013.01)

(56) References Cited

U.S. PATENT DOCUMENTS

| | | | | |
|---|---|---|---|---|
| 5,435,378 A * | 7/1995 | Heine | ................... | B23K 3/047 165/168 |
| 5,465,783 A * | 11/1995 | O'Connor | ............... | F28F 19/00 165/134.1 |
| 5,562,885 A * | 10/1996 | Bayer | .................. | B01J 35/0033 422/173 |
| 5,591,365 A * | 1/1997 | Shields | ................. | E01C 11/265 219/213 |
| 5,655,600 A * | 8/1997 | Dewar | .................. | F28D 9/0062 165/166 |
| 7,401,643 B2 * | 7/2008 | Queheillalt | ........... | C23C 14/046 165/104.21 |
| 7,637,308 B2 * | 12/2009 | Hofer-Noser | ............ | H05B 3/68 165/168 |
| 2004/0139722 A1* | 7/2004 | Czachor | ................ | F28D 9/0037 60/39.511 |
| 2006/0032251 A1* | 2/2006 | Wakita | .................... | B23P 15/26 62/165 |
| 2006/0191675 A1* | 8/2006 | Fletcher | .................. | F28F 3/022 165/172 |
| 2006/0245987 A1* | 11/2006 | Schmidt | ............... | B01J 19/0093 422/198 |
| 2008/0066893 A1 | 3/2008 | Oh et al. | | |
| 2012/0237786 A1* | 9/2012 | Morrison | ................ | B22D 19/00 428/596 |
| 2012/0237805 A1 | 9/2012 | Abels et al. | | |

* cited by examiner

HEAT EXCHANGER

CROSS-REFERENCE TO RELATED PATENT APPLICATIONS

This application is based upon and claims the benefit of priority from prior German Patent Application No. 10 2012 217 875.9, filed Sep. 28, 2012, the entire contents of which are incorporated herein by reference in their entirety.

TECHNICAL FIELD

The invention relates to a heat exchanger having a housing having a first fluid connection and a second fluid connection, the housing being in fluid communication with a fluid circuit, and a fluid flowing through said housing, by means of said fluid connections, wherein the housing has a housing upper part and a housing lower part, wherein the housing has two areas which are of flat extent and which are connected to one another by narrow areas, wherein the housing lower part can be connected to the housing upper part directly and/or by a connecting element by means of an interlocking and/or cohesive connection.

PRIOR ART

Modern high-powered batteries are constructed from a plurality of individual battery cells. They are used for storing energy in electric and hybrid vehicles. In this case, the energy stores used include rechargeable batteries which are based on lithium ions, or nickel-metal hybrid rechargeable batteries. High-power capacitors, so-called supercaps, are also used as an alternative to said batteries.

All of the abovementioned energy stores share the common feature that they always have to be kept at a certain temperature interval for optimum operation. This is necessary in order to ensure the efficiency, the functionality and the reliability of the energy stores.

Care should be taken, in particular, to ensure that there is a temperature distribution which is as uniform as possible within the individual battery cells or the individual battery stacks, which consist of a plurality of individual battery cells, in order to prevent non-uniform aging of the battery cells.

A cooling medium which can exchange thermal energy with the battery by means of a thermal connection is preferably used in order to cool the battery. Both liquids and also gases, for example air, can be used as the cooling medium in this case.

Since the ratio of energy content to inherent weight is still further remote from the ratio of liquid combustion fuels in the case of modern lithium-ion batteries, the design of the energy stores, and also of the entire electric vehicle, should be selected to be weight-optimized as far as possible.

Battery cooling means according to the prior art often have an increased inherent weight on account of their construction. Heat exchangers which are used to cool batteries are generally composed of a metal material, for example of aluminum. When used for cooling batteries, electrical insulation also additionally has to be provided.

SUMMARY OF THE INVENTION, PROBLEM, SOLUTION, ADVANTAGES

The problem of the present invention is to provide a heat exchanger which is optimized in respect of its weight and in which additional electrical insulation can be dispensed with. It should further be possible to produce the heat exchanger in a simple and cost-effective manner.

The problem of the present invention is solved by a heat exchanger having the features according to Claim 1.

An exemplary embodiment of the invention relates to a heat exchanger having a housing, having a first fluid connection and a second fluid connection, the housing being in fluid communication with a fluid circuit, and a fluid flowing through said housing, by means of said fluid connections, wherein the housing a housing upper part and a housing lower part, wherein the housing lower part can be connected to the housing upper part by a connecting element by means of an interlocking and/or cohesive connection, wherein the connecting element has a large number of stud-like elements which are connected to one another by means of connecting crosspieces, wherein the connecting element has an at least partially circumferential edge, and at least the stud-like elements and/or the edge are/is in contact with the housing upper part and/or the housing lower part.

In one exemplary embodiment, the heat exchanger according to the invention serves to control the temperature of an energy accumulator.

A heat exchanger having a connecting element is advantageous since the connecting element additionally stabilizes the heat exchanger. Therefore, by way of example, the housing upper part and the housing lower part can be formed from a relatively thin-walled material. In this way, the entire heat exchanger can be more lightweight, without adversely affecting the stability of the heat exchanger.

The at least partially circumferential and projecting edge of the connecting element is advantageous in order to fix the connecting element within the heat exchanger. The edge can also have a sealing effect.

It is preferred for the housing upper part to be a top plate, and for the housing lower part to be a bottom plate.

It is also advantageous when the connecting element is formed from a plastic or a fiber composite.

A design of the connecting element from plastic is particularly lightweight and therefore particularly advantageous in respect of the total weight of the heat exchanger. Furthermore, construction from a plastic provides the option of even complex shapes being generated by methods which are suitable for large-scale production.

Furthermore, it may be advantageous when the connecting element can be generated by an injection-molding process.

Injection-molding processes are particularly advantageous from the point of view of cost efficiency. Injection molding also provides very high degrees of freedom in respect of shape and can advantageously be used for large-scale production.

It may also be expedient when the housing upper part and/or the housing lower part have/has accommodation regions on their inner face, which is of flat extent, said accommodation regions corresponding to the outer contour of the stud-like elements and/or the outer contour of the edge.

The connecting element can be fixed in the housing of the heat exchanger by means of accommodation regions on the inner faces of the housing parts. Furthermore, it is particularly simply possible to position the connecting element in the housing of the heat exchanger by way of the accommodation regions, in particular during the assembly process.

Furthermore, it may be particularly advantageous when the cross-sectional areas of the stud-like elements and/or of the connecting crosspieces are of flow-promoting configuration in the direction in which fluid flows.

In addition to a circular design, cross sections, such as ovals, rounded rectangles or aerofoil profiles in particular, are advantageous in this case. The cross sections of the stud-like elements can also be approximated or formed, for example, by oval, aerofoil-like or rectangular cross sections. The pressure loss produced in the interior of the housing is reduced by optimizing the connecting crosspieces in respect of flow.

A preferred exemplary embodiment is characterized in that the connecting element is integrally formed with the housing upper part and/or the housing lower part.

The connecting element can advantageously be integrally formed with one or with both housing parts. Particularly when one of the housing parts is composed of a plastic, production of the housing part and of the connecting element can advantageously be combined. As a result, the production process can be simplified overall, and this can lead to a reduction in costs.

In a particularly favorable refinement of the invention, provision is also made for the connecting element to be of two-part form, wherein the stud-like elements are connected to the housing upper part and/or to the housing lower part, and a lattice-like structure which is formed substantially from the connecting crosspieces can be placed into the housing and can be connected to the studs and/or to the housing upper part and/or to the housing lower part by means of an interlocking and/or cohesive connection.

Positioning of the connecting element is particularly simple owing to the distribution of the stud-like elements over the inner faces of the housing upper part and/or of the housing lower part.

It is also preferred when at least one of the fluid connections is integrally formed with the connecting element, wherein the housing upper part and/or the housing lower part have/has an opening which corresponds to the at least one fluid connection.

This is particularly advantageous since the fluid connection can be manufactured together with the connecting element in one process step in this way. In this case, the fluid connection is advantageously manufactured from the same material as the connecting element. As a result, the construction of the housing is likewise less complex since it has to have only one opening which corresponds to the fluid connection and through which the fluid connection can be routed to the outside.

In an alternative refinement of the invention, provision can be made for the connecting crosspieces and/or the lattice-like structure and/or the edge to contain one or more heating elements.

In this case, the heating elements can be designed, for example, as resistance heating elements or as PTC heating elements. In this case, the heating elements are arranged either on the connecting crosspieces or within the connecting crosspieces. In order to arrange the heating elements within the connecting crosspieces, the heating elements can be introduced into the connecting element, for example, as early as during the injection molding of the connecting element. This is particularly advantageous since the heating elements are additionally protected against damage due to mechanical actions from the outside in this way.

Advantageous developments of the present invention are described in the dependent claims and the following description of the figures.

BRIEF DESCRIPTION OF THE DRAWINGS

The invention will be explained in detail below using exemplary embodiments with reference to the drawings. In the drawings.

PREFERRED EMBODIMENT OF THE INVENTION

Figure 1:
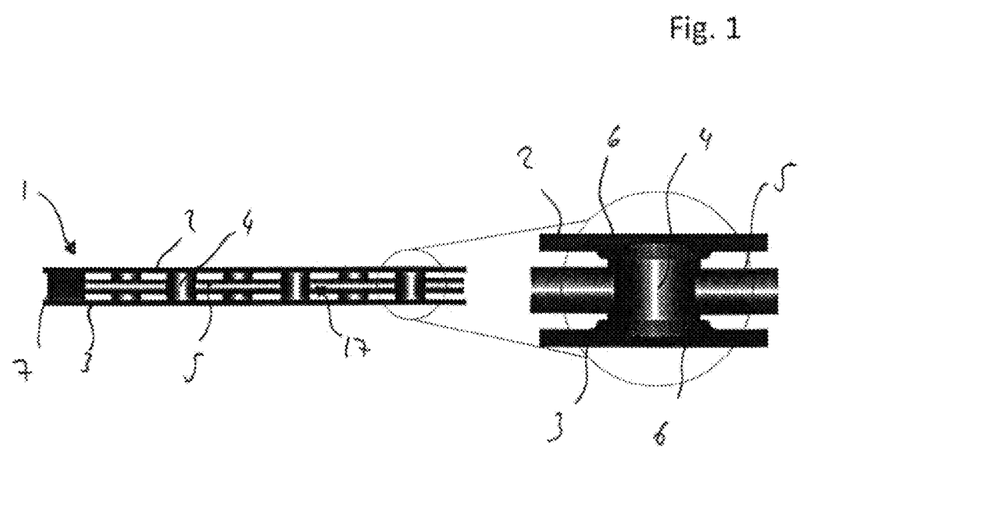
FIG. 1 shows a section through a heat exchanger having a connecting element which is arranged in the heat exchanger.

FIG. 1 shows a section through a heat exchanger 1. The heat exchanger 1 is formed by a housing upper part 2 and a housing lower part 3. A connecting element 17 which comprises a large number of stud-like elements 4 which are connected to one another by a large number of connecting crosspieces 5 is arranged in the interior of the heat exchanger 1. The edge region 7 of the connecting element 17 is formed by the circumferential and projecting edge 7 within the heat exchanger 1. The edge 7 is in contact with the stud-like elements 4 likewise by means of connecting crosspieces 5.

The connecting element 17 is designed such that it is in contact both with the housing upper part 2 and also with the housing lower part 3 by means of the stud-like elements 4.

The circumferential edge 7 can, in addition to a supporting function in relation to the housing of the heat exchanger 1, also have a sealing function in respect of the fluid which flows in the heat exchanger 1.

The right-hand part of FIG. 1 shows a view of a detail of a stud element 4 and the point of connection to the housing upper part 2 and to the housing lower part 3. The view of the detail shows that the housing upper part 2 and the housing lower part 3 each have an accommodation region 6 which corresponds to the outer contour of the stud-like element 4. In the example shown in FIG. 1, the accommodation region 6 is formed in each case by two raised portions on the inner face of the housing upper part 2 and, respectively, of the housing lower part 3. The embodiment, which is shown in FIG. 1, of the accommodation region 6 or of the shape of the stud-like element 4 is only exemplary and can also follow other shapes in alternative embodiments.

Figure 2:
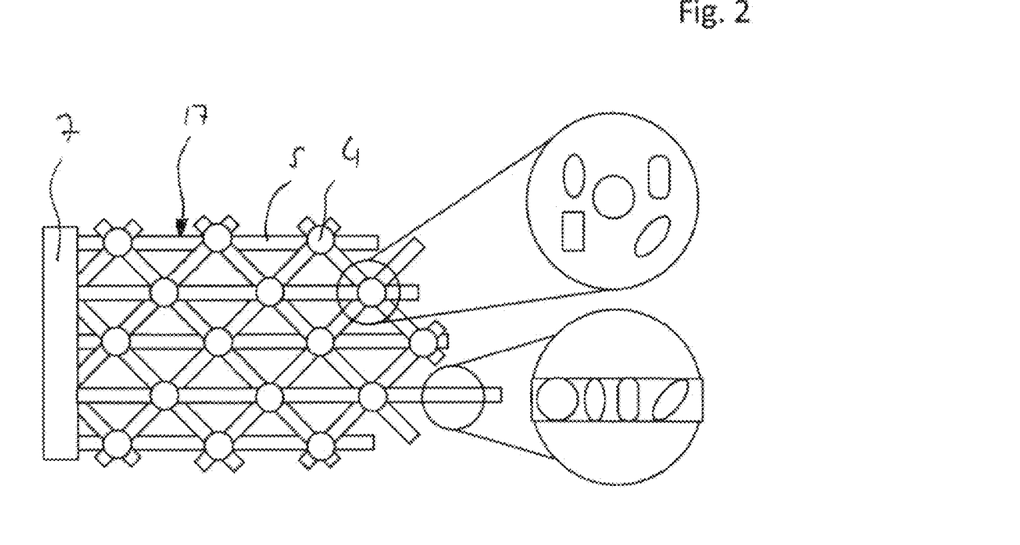
FIG. 2 shows a schematic view of a connecting element, with different embodiments of the stud-like elements and the connecting crosspieces.

FIG. 2 shows a schematic view of a connecting element 17, as has already been shown in FIG. 1. The connecting element 17 likewise comprises stud-like elements 4 which are connected to one another by means of a large number of connecting crosspieces 5. The circumferential edge 7 is connected to the stud-like elements 7 likewise by means of connecting crosspieces 5. The right-hand part of FIG. 2 shows various possible refinements of the stud-like element 4 and of the connecting crosspieces 5. The upper right-hand part of FIG. 2 shows various shapes for the stud-like element 4. Therefore, in addition to the illustrated circular shape, an oval shape, an inclined oval shape, a rectangular shape, or else a rectangular rounded shape can also be selected by way of example. Furthermore, other shapes are also possible.

The lower right-hand part of FIG. 2 shows various refinements of the cross sections of the connecting crosspieces 5. In this case too, it is possible to use, for example in addition to circular cross sections, oval profiles, rectangular profiles with rounded corners or oblique oval profiles. Furthermore, shapes are also possible.

The connecting crosspieces 5 are advantageously selected such that they are designed to promote flow as far as possible in the direction in which the fluid which can flow through the heat exchanger 1 flows. To this end, the connecting crosspieces 5 can, by way of example, also have aerofoil-like shapes.

Figure 3:
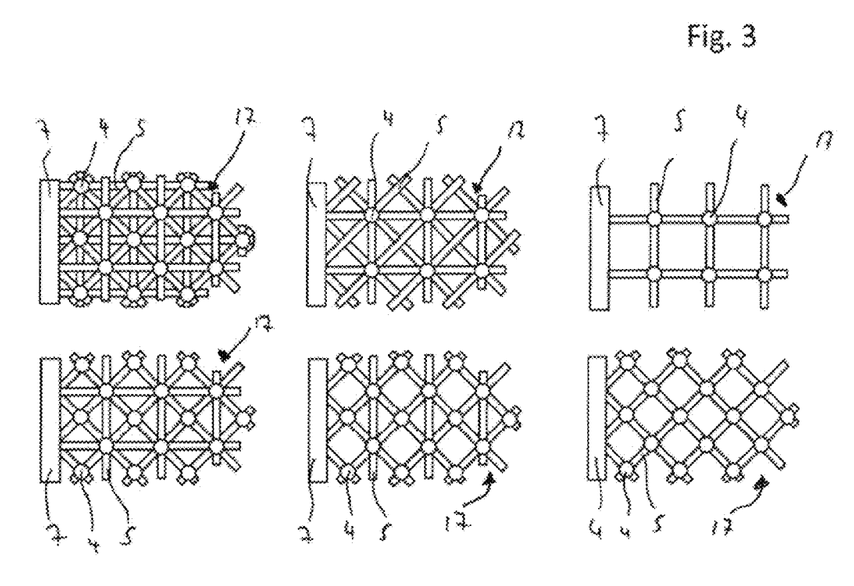
FIG. 3 shows six schematic illustrations of the connecting element, in each case with different arrangements of the stud-like elements and of the connecting crosspieces.

FIG. 3 shows further possible refinements of the connecting element 17. The connecting elements 17 of FIG. 3 also comprise a large number of stud-like elements 4 which are connected to one another by means of connecting crosspieces 5. The connecting element 17 is likewise surrounded by a circumferential edge 7. In the upper left-hand figure, the stud-like elements 4 are each connected to one another both by means of horizontal, vertical and also diagonal connecting crosspieces 5. This creates a fine-meshed connecting element 17. The stud-like elements 4 are arranged such that a fifth stud-like element 4 is arranged in the center in each case in a square which is spanned by four stud-like elements 4.

The embodiment at the top center shows an arrangement in which in each case four stud-like elements 4 are arranged in a square and are connected to one another by horizontal, vertical and diagonal crosspieces 5.

The embodiment at the top right shows a connecting element 17, wherein the stud-like elements 4 are each connected to one another only by means of horizontal and vertical connecting crosspieces.

The variant embodiment at the bottom left shows a further embodiment, wherein horizontal, vertical and diagonal connecting crosspieces 5 are once again provided. However, in comparison to the embodiment at the top left, several vertical connecting crosspieces 5 are omitted, with the result that a coarse-meshed connecting element 17 is created.

The exemplary embodiment at the bottom center shows a connecting element 17, wherein the stud-like elements 4 are each connected to one another by diagonal and vertical connections. In contrast to the other embodiments, the connecting element 17 does not have any horizontal connecting crosspieces 5.

The exemplary embodiment at the bottom right shows a connecting element 17, wherein the stud-like elements are connected only by diagonal connecting crosspieces 5.

Figure 4:
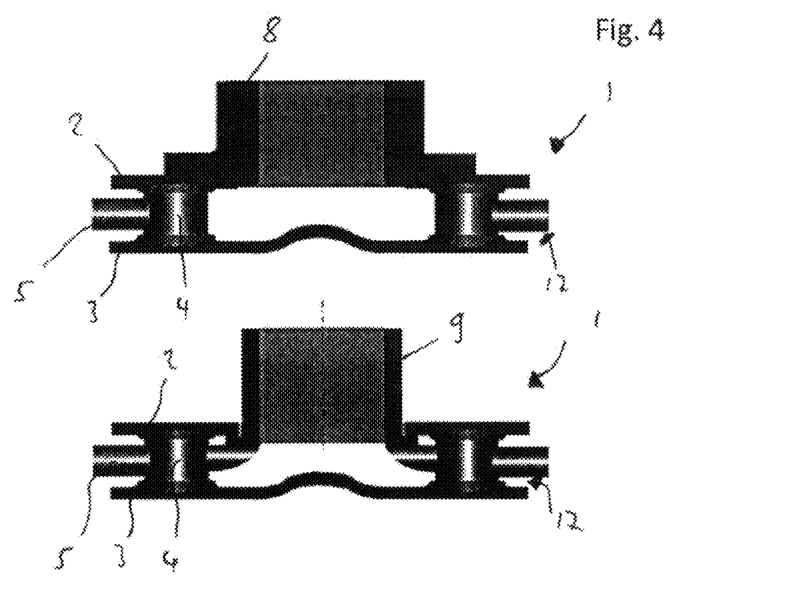
FIG. 4 shows two sectional views through a heat exchanger, wherein a fluid connection is arranged on the housing upper part in the upper view, and a fluid outlet is arranged on the connecting element in the lower view.

FIG. 4 shows two sectional views through a heat exchanger 1. The upper view shows a fluid connection 8 which is arranged on the housing upper part 2. To this end, the housing upper part 2 has an opening in which the fluid connection 8 engages. The housing lower part 3 has a bead which is fitted opposite the fluid connection 8. The fluid is advantageously intended to be distributed within the heat exchanger 1 by means of said bead.

In the upper part of FIG. 4, the connecting element 17 is in direct contact only with the housing upper part 2 and, respectively, the housing lower part 3. For its part, the fluid connection 8 is in contact only with the housing upper part 2.

The lower part of FIG. 4 shows an embodiment in which the fluid connection 9 is integrated directly into the connecting element 17. The connecting crosspieces 5, which connect the stud-like elements 4 to one another, are also connected to the fluid connection 9. The housing upper part 2 has an opening through which the fluid connection 9 passes. The point of connection between the fluid connection 9 and the housing upper part 2 can be sealed off in a fluid-tight manner by an adhesive layer or some other kind of sealing means. As in the upper part of FIG. 4, the housing lower part 3 has a bead which is arranged opposite the fluid connection 9 and which is intended to promote the distribution of fluid within the heat exchanger 1.

Furthermore, the connecting elements 17 in the upper part and also in the lower part of FIG. 4, as illustrated in FIG. 1, are connected to the housing upper part 2 and, respectively, to the housing lower part 3.

The fluid connection 8, 9 can advantageously be formed from a metal material, but design from a plastic is also feasible. This is advantageous, in particular, for the fluid connection 9 since the connecting element 17 in the interior of the heat exchanger 1 is likewise formed from a plastic. In this way, the connecting element 17 can be integrally produced with the fluid connection 9.

Figure 5:
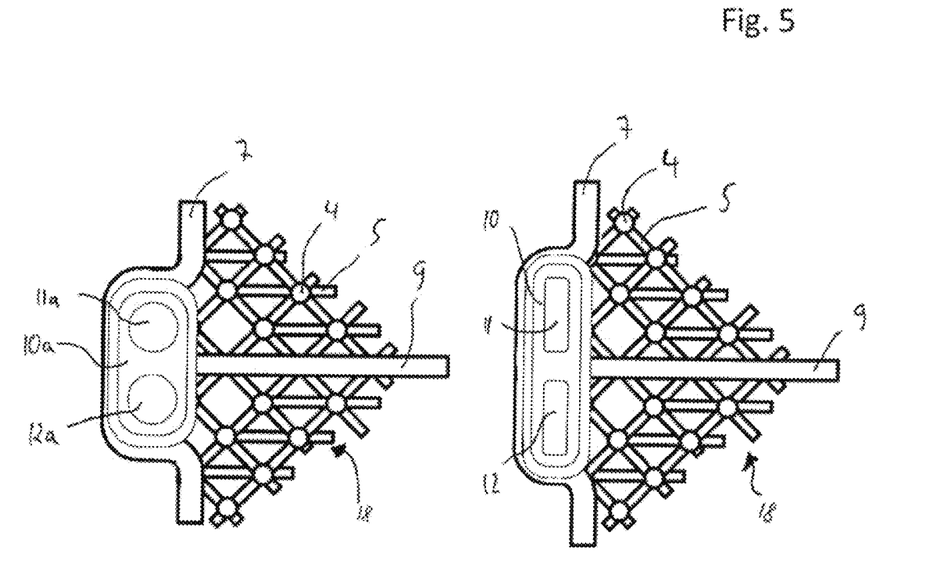
FIG. 5 shows two views of a connecting element, wherein the left-hand view differs from the right-hand view by virtue of a differing fluid connection.

FIG. 5 shows a schematic view of two connecting elements 18 which each have different fluid connections 10*a*, 10. The left-hand part of the figure shows a fluid connection 10*a* which is directly integrally formed with the connecting element 18. In this case, the fluid connection 10*a* has a fluid inlet 11*a* and a fluid outlet 12*a*.

In contrast to the embodiments shown above, the connecting element 18 is developed in such a way that a partition wall 9 is arranged within the connecting element 18, said partition wall dividing the interior of the heat exchanger 1 into two chambers.

The fluid connection 10*a* and, respectively, the fluid inlet 11*a* and fluid outlet 12*a* are of circular design in the embodiment in the left-hand part of FIG. 5.

Similarly to the embodiment in FIG. 4, both the fluid connection 10 and the fluid connection 10*a* can be arranged either on the housing upper part 2 or directly on the connecting element 18.

The right-hand part of FIG. 5 shows an embodiment of a connecting element 18 analogously to the left-hand part of FIG. 5, but with the fluid connection 10 and, respectively, the fluid inlet 11 and fluid outlet 12 being of differing design in this case. The fluid inlet 11 and fluid outlet 12 have a substantially rectangular basic shape in this case.

Also in a departure from the exemplary embodiments of FIG. 5, other shapes can be selected for the fluid connection 10, 10*a* and, respectively, for the fluid inlets 11, 11*a* and, respectively, fluid outlets 12, 12*a*. In the two views, the partition wall 9 in each case constitutes a division of the internal volume into two chambers. A region in the partition wall 9 by means of which the two chambers are in fluid communication with one another is not illustrated in FIG. 5.

Figure 6:
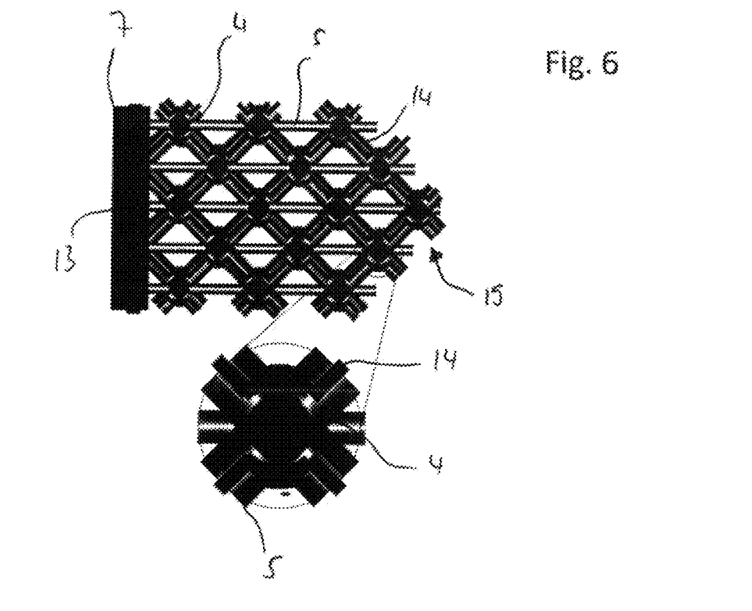
FIG. 6 shows an embodiment of a connecting element, wherein the connecting crosspieces have heating elements.

FIG. 6 shows a further development of the connecting element 19. In addition to the stud-like elements 4, the connecting crosspieces 5 and the circumferential edge 7, the connecting element 19 has heating elements 14 which run on or within the connecting crosspieces 5.

These heating elements can advantageously be resistance heating elements or else PTC heating elements.

A connection line 13 by means of which power is supplied to the heating elements 14 in the connecting element 19 is arranged in the circumferential edge 7.

The lower part of FIG. 6 shows a view of a detail which shows that the heating elements 14 and, respectively, the lines to which the individual heating elements 14 are connected do not run through the stud-like elements 4, but rather around said stud-like elements in order to not weaken the structural integrity of the stud-like elements 4.

In this case, the heating elements 14 can be fitted either on the outer circumference of the connecting crosspieces 5 or else can be encapsulated in the connecting crosspieces 5 together with the connecting element 19 in one production process. This can advantageously be performed by a production process by means of injection molding.

Figure 7:
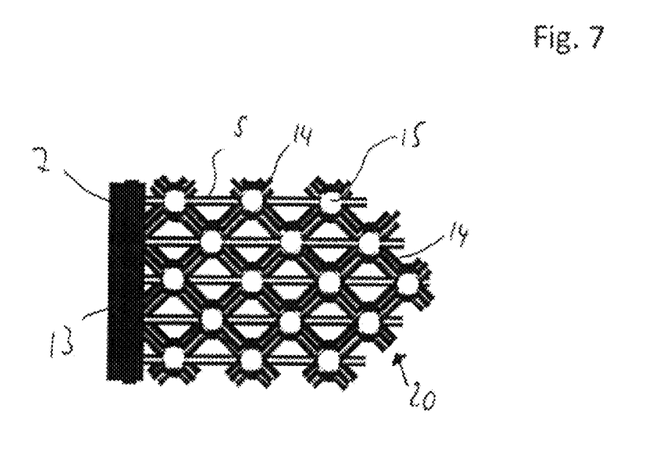
FIG. 7 shows an exemplary embodiment of a connecting element, wherein, instead of the stud-like elements, openings are provided at the node points of the connecting crosspieces, it being possible for the connecting element to be positioned and fixed in a housing of a heat exchanger by way of said openings.

FIG. 7 shows a further alternative refinement of a connecting element 20. In a departure from the connecting element 19 of FIG. 6, the connecting element 20 does not have any stud-like elements 4. This results in a connecting element 20 which, instead of the stud-like elements 4, has openings 15 at the node points of the connecting crosspieces 5. These openings 15 serve to position and fix the connecting element 20 within the heat exchanger 1 to its housing upper part 2 and, respectively, housing lower part 3.

As in FIG. 6, the connecting element 20 has heating elements 14 and a connection line 13 which runs in the edge 7.

Figure 8:
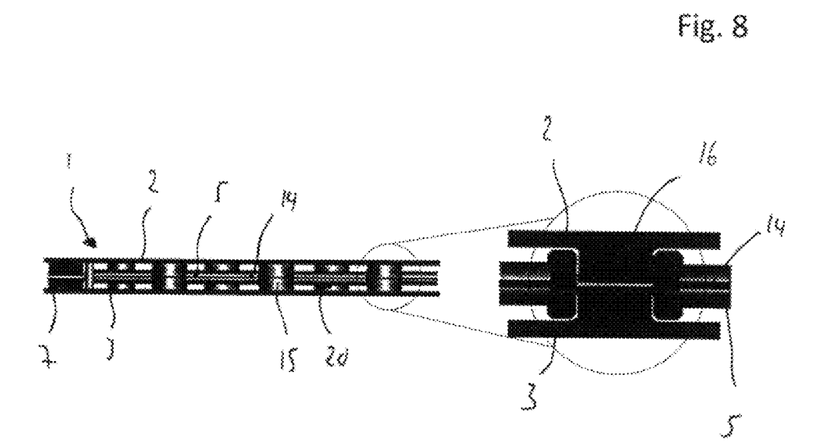
FIG. 8 shows a section through a heat exchanger having a connecting element according to FIG. 7.

FIG. 8 shows a sectional view through a heat exchanger 1. The connecting element 20 according to FIG. 7 is now integrated in the heat exchanger 1 of FIG. 8. As shown in the right-hand part of FIG. 8, the housing upper part 2 and, respectively, the housing lower part 3 now each have a projection 16 which serves to position the connecting element 20 according to FIG. 7. In this case, the projections 16 are designed such that the openings 15 in the connecting element 20 according to FIG. 7 can engage around the projections 16 with an accurate fit. The further design of the heat exchanger 1 which is shown in FIG. 8 corresponds to the design which is described in the preceding figures.

All of the connecting elements 17, 18, 19, 20 which are shown in FIGS. 1 to 8 can be composed, for example, of a fiber-reinforced plastic which provides the connecting element 17, 18, 19, 20 with, in particular, a high strength. In this case, the connecting element 17, 18, 19, 20 can advantageously be produced using an injection-molding process. As an alternative, it is also feasible to produce the connecting element 17, 18, 19, 20 from a metal material.

The housing upper part 2 and the housing lower part 3 can selectively be composed of a plastic or a lightweight metal, for example aluminum. It is also conceivable to produce said parts from a composite, for example a plastic/aluminum/plastic combination or from a plastic which is reinforced with fibers or fabric, for example glass or carbon fibers. So-called organosheets are likewise also feasible.

The heat exchanger 1 can be produced by a large number of different methods. By way of example, welding methods, adhesive-bonding methods or other mechanical joining methods can be used, depending on the material selected for the housing upper part 2 and, respectively, the housing lower part 3.

The invention claimed is:

1. A heat exchanger comprising:
   a housing;
   a first fluid connection and a second fluid connection, wherein the housing is in fluid communication with a fluid circuit, wherein a fluid flows through said housing by way of said first fluid connection and second fluid connection;
   The housing being defined by a housing upper part and a housing lower part, wherein the housing lower part is connected to the housing upper part by a connecting element defined by a lattice through an interlocking or cohesive connection,
   where the connecting elements include a plurality of stud-like elements and connecting crosspieces, where the stud-like-elements each have an at least partially circumferential edge, wherein the stud-like elements are connected to one another by the connecting crosspieces, where each of the stud-like elements are connected to the housing upper part and the housing lower part, and where each of the connecting crosspieces are connected to at least one of the housing upper part, the housing lower part, and the plurality of studs, and
   a plurality of heating elements, wherein the plurality of heating elements are located on or within the connecting crosspieces or the lattice-like structure or the partially circumferential edge.

2. The heat exchanger according to claim 1, wherein the housing upper part is a top plate, and the housing lower part is a bottom plate.

3. The heat exchanger according to claim 1, wherein the connecting element is formed from a plastic or from a fiber composite.

4. The heat exchanger according to claim 1, wherein the connecting element is injection-molded.

5. The heat exchanger according to claim 1, wherein the housing upper part or the housing lower part has accommodation regions on their inner face, which are of flat extent, said accommodation regions corresponding to an outer contour of the stud-like elements or the outer contour of the edge.

6. The heat exchanger according to claim 1, wherein the cross-sectional areas of the stud-like elements or of the connecting crosspieces are of flow-promoting configuration in a direction in which fluid flows.

7. The heat exchanger according to claim 1, wherein the connecting element is integrally formed with the housing upper part or the housing lower part.

8. The heat exchanger according to claim 1, wherein the at least one of the fluid connections is integrally formed with the connecting element, wherein the housing upper part or the housing lower part has an opening which corresponds to the at least one fluid connection.

9. The heat exchanger according to claim 1, wherein the housing upper part or the housing lower part has at least one of the fluid connections.

* * * * *

UNITED STATES PATENT AND TRADEMARK OFFICE
CERTIFICATE OF CORRECTION

PATENT NO. : 9,513,066 B2
APPLICATION NO. : 14/038860
DATED : December 6, 2016
INVENTOR(S) : Wiebelt et al.

Page 1 of 1

It is certified that error appears in the above-identified patent and that said Letters Patent is hereby corrected as shown below:

Column 8, Lines 2-28, Claim 1 should read as follows:

--1. A heat exchanger comprising:
    a housing;
    a first fluid connection and a second fluid connection, wherein the housing is in fluid communication with a fluid circuit, wherein a fluid flows through said housing by way of said first fluid connection and second fluid connection;
    the housing being defined by a housing upper part and a housing lower part, wherein the housing lower part is connected to the housing upper part by a connecting element defined by a lattice through an interlocking or cohesive connection, where the connecting elements include a plurality of stud-like elements and connecting crosspieces, where the stud-like elements each have an at least partially circumferential edge, wherein the stud-like elements are connected to one another by the connecting crosspieces, where each of the stud-like elements are connected to the housing upper part and the housing lower part, and where each of the connecting crosspieces are connected to at least one of the housing upper part, the housing lower part, and the plurality of studs; and
    a plurality of heating elements, wherein the plurality of heating elements are located on or within the connecting crosspieces or the lattice-like structure or the partially circumferential edge.--

Signed and Sealed this
Thirteenth Day of November, 2018

Andrei Iancu
*Director of the United States Patent and Trademark Office*